(12) United States Patent
Schmitt

(10) Patent No.: US 8,611,241 B2
(45) Date of Patent: Dec. 17, 2013

(54) PROCESS FOR SELECTION OF RESOURCES TO BE RELEASED IN CASE OF AN OVERLOAD IN A CELLULAR LAND MOBILE SYSTEM

(75) Inventor: Harald Schmitt, Bendorf (DE)

(73) Assignee: Deutsche Telekom AG, Bonn (DE)

( * ) Notice: Subject to any disclaimer, the term of this patent is extended or adjusted under 35 U.S.C. 154(b) by 112 days.

(21) Appl. No.: 12/994,640

(22) PCT Filed: Aug. 14, 2009

(86) PCT No.: PCT/EP2009/005906
§ 371 (c)(1),
(2), (4) Date: Dec. 14, 2010

(87) PCT Pub. No.: WO2010/020377
PCT Pub. Date: Feb. 25, 2010

(65) Prior Publication Data
US 2011/0128874 A1 Jun. 2, 2011

(30) Foreign Application Priority Data

Aug. 21, 2008 (DE) .......................... 10 2008 038 590

(51) Int. Cl.
*H04L 1/00* (2006.01)
*H04L 12/26* (2006.01)

(52) U.S. Cl.
USPC .......................................................... 370/252

(58) Field of Classification Search
None
See application file for complete search history.

(56) References Cited

U.S. PATENT DOCUMENTS

| | | | | |
|---|---|---|---|---|
| 5,615,249 | A * | 3/1997 | Solondz | 455/450 |
| 5,745,853 | A * | 4/1998 | Hippelainen | 455/450 |
| 6,031,845 | A * | 2/2000 | Walding | 370/468 |
| 6,192,248 | B1 * | 2/2001 | Solondz | 455/450 |
| 6,606,499 | B1 * | 8/2003 | Verrier et al. | 455/452.1 |
| 6,795,709 | B2 * | 9/2004 | Agrawal et al. | 455/452.1 |
| 6,931,253 | B1 | 8/2005 | Hartikainen et al. | |
| 7,388,882 | B2 * | 6/2008 | Benco et al. | 370/468 |
| 7,886,074 | B2 * | 2/2011 | England et al. | 709/232 |
| 2006/0159004 | A1 | 7/2006 | Ji | |
| 2008/0070545 | A1 * | 3/2008 | Lim et al. | 455/404.1 |

FOREIGN PATENT DOCUMENTS

CN 1728867 A 2/2006

* cited by examiner

*Primary Examiner* — Ayaz Sheikh
*Assistant Examiner* — Blanche Wong
(74) *Attorney, Agent, or Firm* — Andrew Wilford

(57) ABSTRACT

Process and land mobile system for operating a cellular land mobile network in which in case of an overload certain resources of the land mobile network currently being used can be released in order to be available for higher priority applications, and resources can be usable at the same time by several applications, characterized in that selection of the resource to be released takes place, for all resources under consideration an efficiency factor being determined and the resource with the lowest efficiency factor being released.

12 Claims, 2 Drawing Sheets

- High priority call with 10CE is to be set up.

Only resource_efficiencies [1], [2] and [3] need be computed since only these resource blocks make available enough resources for the new call.

- High priority call with 10CE is to be set up.     Fig. 1
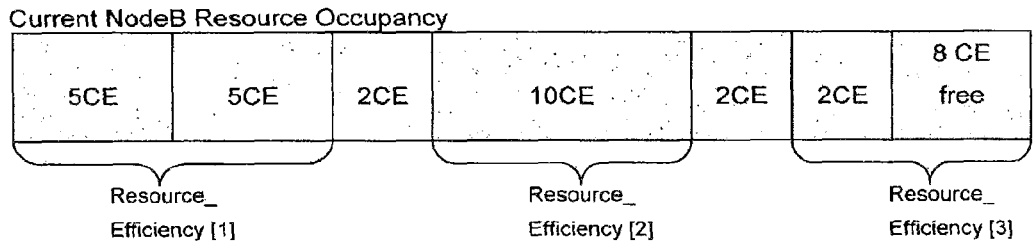
Only resource_efficiencies [1], [2] and [3] need be computed since only these resource blocks make available enough resources for the new call.
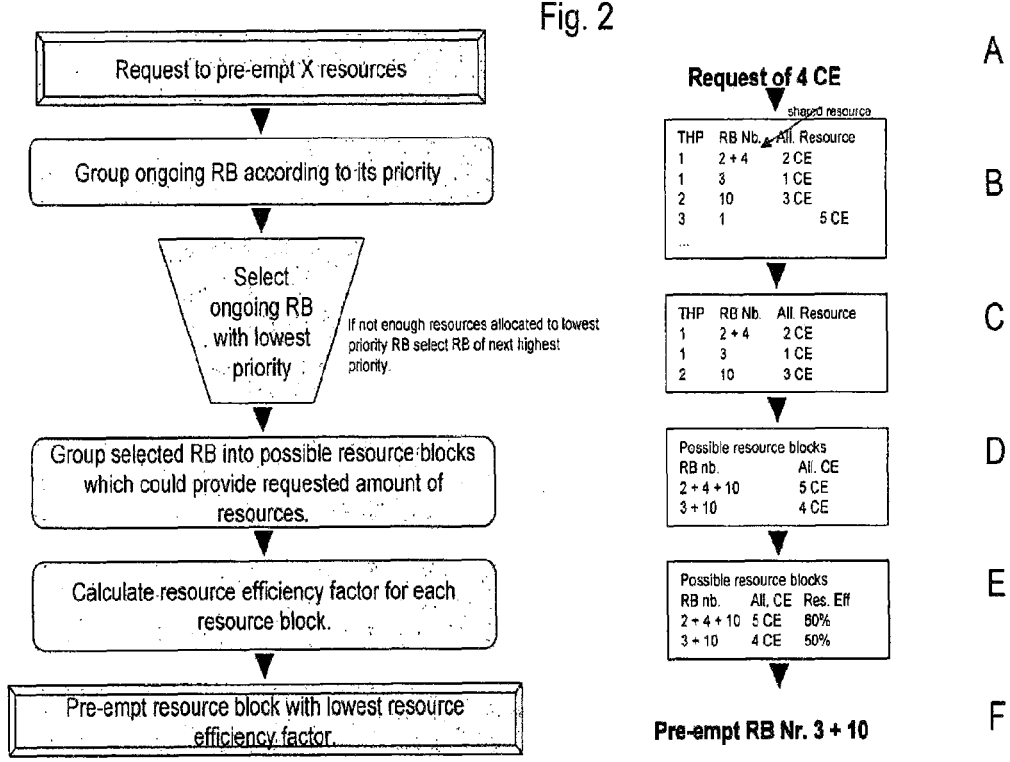
Fig. 2

```
┌─────────────────────────────────────────────────────────────┐
│ Overload in a cellular land mobile network;                 │
│ Resources in a transmission channel of the network are      │
│ currently being used, providing a certain transmission      │
│ capacity in the channel for an application or a call,       │
│ the capacity being defined in the form of an amount of      │
│ baseband processing capacity                                │
└─────────────────────────────────────────────────────────────┘
                              ▼
┌─────────────────────────────────────────────────────────────┐
│         Starting a higher priority application or call      │
└─────────────────────────────────────────────────────────────┘
                              ▼
┌─────────────────────────────────────────────────────────────┐
│ determining the resources required for the higher priority  │
│                    application or call and                  │
└─────────────────────────────────────────────────────────────┘
                              ▼
┌─────────────────────────────────────────────────────────────┐
│ computing therefrom the amount of baseband processing       │
│                  capacity to be released                    │
└─────────────────────────────────────────────────────────────┘
                              ▼
┌─────────────────────────────────────────────────────────────┐
│ if a resource currently occupied by a single application or │
│ call does not reach the amount of baseband processing       │
│ capacity required for the higher priority application or    │
│ call, grouping of currently occupied resources together in  │
│ that a resource group reaches the amount of baseband        │
│ processing capacity required for the higher priority        │
│ application or call,                                        │
└─────────────────────────────────────────────────────────────┘
                              ▼
┌─────────────────────────────────────────────────────────────┐
│ computing an efficiency factor for all resources and        │
│ resource groups having an amount of baseband processing     │
│ capacity required for the higher priority application or    │
│ call                                                        │
└─────────────────────────────────────────────────────────────┘
                              ▼
┌─────────────────────────────────────────────────────────────┐
│ releasing the resource or resource group with the lowest    │
│                      efficiency factor.                     │
└─────────────────────────────────────────────────────────────┘
```

Fig. 3

PROCESS FOR SELECTION OF RESOURCES TO BE RELEASED IN CASE OF AN OVERLOAD IN A CELLULAR LAND MOBILE SYSTEM

CROSS REFERENCE TO RELATED APPLICATIONS

This application is the US-national stage of PCT application PCT/EP2009/005906, filed 14 Aug. 2009, published 28 Feb. 2010 as WO2010020377, and claiming the priority of German patent application 102008038590.5 itself filed 21 Aug. 2008.

FIELD OF THE INVENTION

The invention relates to a process for operating a cellular land mobile network in which in case of an overload certain resources of the land mobile network currently being used can be released in order to be available for higher priority applications, and resources can be usable at the same time by several applications.

BACKGROUND OF THE INVENTION

Thus, this invention relates to a process for selection of occupied network resources which must be released to enable higher priority calls in a cellular land mobile system, for example according to the GERAN, UTRAN, E-UTRAN, cdma2000, UMB, WiMAX, etc. standard. These scenarios ordinarily occur in an overload situation.

Occupied network resources must always be released when the available free network resources are no longer sufficient to enable new higher priority calls. Higher priority calls are for example voice calls or streaming calls which are generally called real time applications or real time services. In contrast to real time services, lower priority calls are called non real time service. They include especially applications such as Internet browsing or sending/receiving E-mail.

The prior art in the selection of resources to be released takes into account only resources which are being occupied by individual users. In current land mobile system however resources are also used by several applications or users at the same time, so-called shared resources. A prominent example of a shared resource is the baseband resource of a node B which is being used for HSDPA channels. HSDPA in the node B baseband occupies a certain resource according to the maximum HSDPA bandwidth. The number of users who are sharing the bandwidth is independent of the occupied resources.

OBJECT OF THE INVENTION

The object of the invention is to develop a process of the above-mentioned type which overcomes the above-described disadvantages and especially to define a selection algorithm for selection of a resource to be released, which also considers shared resources.

SUMMARY OF THE INVENTION

This object is achieved by the invention in that for operating a cellular land mobile network in which in case of an overload certain resources of the land mobile network currently being used must be released in order to be available for higher priority applications, and resources can be usable at the same time by several applications, it is advantageous that selection of the resource to be released takes place, for all resources under consideration an efficiency factor being determined and the resource with the lowest efficiency factor being released.

In the land mobile system according to the invention comprising a cellular land mobile network in which in case of an overload certain resources of the land mobile network currently being used can be released in order to be able to be available for higher priority applications, and resources can be usable at the same time by several applications, it is especially advantageous for the land mobile system to have a control unit which is set up to select the resource to be released by an efficiency factor being determined for all resources under consideration and the resource with the lowest efficiency factor being released.

The concept of resource can relate to any conceivable resource in a land mobile network, for example transmitting station baseband processing capacity, air interface capacity, line capacity, or other. The concept of resource thus encompasses any network infrastructure or capacity of the land mobile network or of the land mobile system.

With the process of the invention, by releasing certain parts or resources of the network infrastructure, in order to make them available for higher priority applications and/or calls, perceptible intervention or perceptible consequences of a release are minimized by the release of resources taking place as a function of the efficiency factor which is determined beforehand using parameters.

The basic idea of the invention is thus to release resources in which the number of affected applications or subscribers is minimized and at the same time the size of the resource to be released is maximized.

By reducing the number of affected applications or subscribers the effect on customers is reduced. By maximizing resource size the number of releases of resources is reduced. This is achieved by the free resources being maximized with a release process and thus by free resources becoming available for future, new call set-ups.

In the process according to the invention for selection of resources to be released in the case of an overload in a cellular land mobile system in which resources can be used at the same time by several users, for all resources under consideration an efficiency factor is computed regardless of whether resources are being used by individual or several subscribers, and the resource with the lowest efficiency factor is released.

The concept of release means especially the ending of a current application for example by interrupting and ending an existing wireless connection to a transmitting means of the land mobile network so that the resource, therefore for example a wireless channel or network infrastructure of any type, is available for another application which has higher priority and for the more highly rated application a connection can be set up using the network infrastructure released previously.

Releasing thus means disconnection, breaking, clearing, interrupting, i.e., the clearing of a connection, decoupling or the like, i.e. that the selected resources is made usable for other applications, communications links or the like.

In the process and systems of the invention it is especially advantageous that especially the following requirements are satisfied:

higher priority calls or applications release active lower priority calls or applications in the case of a load situation.

the selection algorithm takes into account shared and non shared resources.

the selection algorithm does not take into account the type of transport channel (for example HSDPA, HSUPA, etc.).

release of occupied resources means effects on current applications and thus on customers. Therefore the selection algorithm is designed to reduce the effect on applications and customers.

release of resources is a complex process since it is time-critical. Therefore the selection algorithm should minimize the number of resource releases.

the selection algorithm is intended to be possible for all types of higher priority calls and/or applications (for example voice calls or streaming applications).

The selection algorithm according to the invention use especially the following input criteria:

Call priority
This criterion ensures that the lowest priority calls are selected first as a target of release.

Number of affected subscribers who are currently using a possible resource to be released.
This criterion ensures that the effects on customers are minimized.

Size of the resource to be released
This criterion ensures that the number of releases is minimized.

Preferably the efficiency factor of a network resource is computed depending on the number of applications currently using the resource, especially as a quotient of the number of applications divided by the capacity of the resource so that the absolute number of applications is maximized.

This means that the efficiency factor based on the number of users or applications to be released and the resource occupied by these users or applications is computed and thus maximizes the system capacity with reference to applications, i.e. users.

In one alternative configuration the efficiency factor is computed depending on the data rate of the applications which are currently using the resource, especially as a quotient of the data rate of the applications divided by the capacity of the resource so that the absolute data rate is maximized.

This means that the efficiency factor based on the current data rate of the applications or users to be released and the resource occupied by these applications or users is computed and thus the system capacity is maximized with respect to the data rate.

In one preferred configuration the priority of the applications currently using the resource is considered, in particular computation of the efficiency factor and optionally release of only those resources whose applications in current use are the lowest priority applications take place. I.e., that especially as additional information the priority of the applications or subscribers to be released is considered and the efficiency factor is computed only for the lowest priority applications or subscribers.

The proposed algorithm in detail appears as follows: If a new call in case of overload cannot be set up due to insufficient free resources, for each possible currently occupied resource which would be sufficient to execute the new call an efficiency factor is computed. Furthermore, only those resources are considered to which instantaneous calls of the currently lowest priority are assigned. The resource with the lowest efficiency factor is selected for release.

Using the example of transmitting station baseband processing capacity the efficiency factor is defined as follows: Here the CE (channel element) is a measure of the transmitting station baseband processing capacity $$\text{Resource\_efficiency}[i] = \frac{\text{No.\_of\_User}[i]}{\text{Allocated\_CEs}}$$

i: Number of the resource block which could be released. The efficiency factor of the resource "i" is therefore equal to the quotient of the number of applications or users instantaneously using the resource "i" divided by the amount of capacity made available by the resource "i" in the form of the respective CE (channel element).

For the example of transmitting station baseband processing capacity the resource efficiency for an AMR call is 1. A subscriber uses only 1 CE. For shared resources such as for example HSDPA several subscribers are using one resource block (for example 3 subscribers are using 30 CE→resource efficiency=10%; or 1 subscriber is using 30 CE→resource efficiency=3.3%).

The selection algorithm compares all resource efficiency factors of the resources which are being used by applications or subscribers to the lowest resource and selects the resource with the lowest value as the target for release.

The resource efficiency factor is computed for all resource blocks which can be used for the new call. If the new call requires for example a capacity of 10 CE, the efficiency factor is computed for all resource blocks of 1 OCE. Or in the case in which free resources are already available the efficiency factor is computed for the additionally required resources.

BRIEF DESCRIPTION OF THE DRAWING

In the drawing:
FIG. 1 is a diagram showing resource use of a communication node;
FIG. 2 is a diagram illustrating this invention; and
FIG. 3 is a flow chart illustrating the method of this invention.

DETAILED DESCRIPTION OF THE INVENTION

Such an example is shown in FIG. 1. A high priority call which requires a capacity of 10 wireless channel elements CE is to be set up. FIG. 1 schematically shows the current node B resource occupancy.

Only resource efficiencies [1], [2], and [3] need be computed since only these resource blocks make available enough resources for the new call which requires 10 CE.

One possible disadvantage of the above described algorithm is that the number of affected applications or subscribers which are released in one step is not minimal. But since the number of releases is minimized, future releases are avoided and thus the number of affected applications and customers is minimized.

FIG. 2 shows a flow chart and an outline of one embodiment of the selection algorithm with process steps A to F.

In the first step A the resources currently required for higher priority applications are determined and the quality or capacity of the resources to be released is computed therefrom by the quantity or capacity of currently free resources being subtracted from the required resources.

In the second step B the currently occupied resources are grouped according to their priority.

In the third step C the resources with lowest priority are selected as the target for release. In the case in which the resources of the lowest priority are not sufficient to deliver the quantity of currently required resources, resources of the next higher priority are additionally selected as the target of release.

In the fourth step D possible groupings which reach the quantity of the required resources for the higher priority application are formed from the list of resources which can be released, determined in step C.

In step E the individual efficiency in the form of the respective efficiency factor is computed for each resource grouping determined in step C.

In the last process step F that resource is chosen which has the lowest efficiency factor. This resource is accordingly selected for release.

The above described algorithm maximizes the resource efficiency with reference to the number of instantaneous applications or users. That is, the number of users in the system is maximized. By adaptation of the algorithm instead of the number of applications/users the system capacity can also be maximized. For this application, instead of the number of applications or users the user data rate is considered.

$$\text{Resource\_efficiency(capacity)}[i] = \frac{\sum_{1}^{n} \text{User\_throughput}(x)}{\text{Allocated\_CEs} * \text{capacity\_per\_CE}}$$

The data rates which are produced by the user who is using a certain resource is referenced to the occupied resource.

In this procedure the efficiency of the resource "i" is dependent on the data rate, i.e. it corresponds to the quotient of the sum of the data throughput of all n applications which are instantaneously using the resource i divided by the allocated or used wireless network elements multiplied by the capacity per element.

Example 1

Transmitting station has no free capacities, i.e. no \get free CEs AMR call with 1 CE is to be newly set up,
Existing Calls:
[1] 1×16 kbps Re199 (1CE)
[2] 1×384 Re199 (12CE) and
[3] 1 HSUPA subscriber (30 CE)
ICE must be cleared; resource efficiency for ICE must be computed;
Resource efficiency [1] 16 kbps R99=1
Resource efficiency [2] 384 kbps R99=1/12=8.3%
Resource efficiency [3] HSUPA=1/30=3.33%→Resource [3] HSUPA resource is released.

Example 2

Node B has 2 free CE
Streaming call with 4CE is to be set up
Existing Calls:
[1] 1×16 kbps Re199 (4CE)
[2] I×384 Re 199 (12CE) and
[3] 1 HSUPA subscriber (30CE):
2CE must be released; resource efficiency for 2CE must be computed;
Resource efficiency [1] 2×16 kbps=2/2=1
Resource efficiency [2] 384 kbps=1/12=8.3%
Resource efficiency [3] HSUPA=3/30=10%→Resource [2] 384 is released.

The invention claimed is:

1. In a process for operating a cellular land mobile network in case of an overload by releasing transmission channel elements of a transmission channel of the cellular land mobile network currently being used for telecommunication or data transmission in order to be made available for a higher priority application or call and the transmission channel can be used at the same time by several applications, each of the channel elements providing for an application or a call a certain transmission capacity defined as a number of channel elements, the improvement of selecting the channel elements to be released by the steps of:
   determining the number of channel elements required for the higher priority application or call and computing therefrom the number of channel elements to be released by subtracting the number of currently free channel elements from the determined number of channel elements required by the higher priority application or call,
   if a number of channel elements currently occupied by a single application or call is less than the computed number of channel elements to be released for the higher priority application or call, grouping of currently occupied channel elements together such that the group of channel elements is at least equal to the computed number of channel elements to be released for the higher priority application or call,
   computing an efficiency factor for all channel elements currently occupied by a single application or call and for all groups of channel elements having a total number of channel elements at least equal to the computed number of channel elements to be released for the higher priority application or call as a quotient of the number of applications and calls currently using the channel elements or group of channel elements divided by the number of channel elements occupied by the application or call by the group of channel elements, and
   releasing the channel elements or group of channel elements with the lowest efficiency factor.

2. The process defined in claim 1, wherein a priority of the applications and calls currently using the channel elements or a group of channel elements is considered.

3. The process defined in claim 2, wherein the efficiency factors of only those channel elements and groups of channel elements are computed whose applications or calls in current use have the lowest priority.

4. The process defined in claim 3, wherein release of only those channel elements and groups of channel elements are released whose applications or calls in current use have the lowest priority.

5. The process defined in claim 2, wherein the channel elements are grouped according to their priority.

6. The process defined in claim 5, wherein if the grouped channel elements of the lowest priority are not sufficient to deliver the number of currently required channel elements, channel elements of the next higher priority are additionally selected as the target of release and added to the group.

7. In a process for operating a cellular land mobile network in case of an overload by releasing channel elements of a transmission channel of the cellular land mobile network currently being used for telecommunication or data transmission in order to be made available for a higher priority application or call, and the transmission channel can be used at the same time by several applications, each of the channel elements providing for an application or call a certain transmission capacity defined as a number of channel elements,
   the improvement of selecting the channel elements to be released by the steps of:

computing the number of channel elements required for the higher priority application or call and computing therefrom the number of channel elements to be released by subtracting the number of currently free channel elements from the computed number of channel elements required by the higher priority application or call, if a number of channel elements currently occupied by a single application or call is less than the computed number of channel elements to be released for the higher priority application or call, grouping of currently occupied channel elements together such that the number of channel elements in the group is at least equal to the computed number of channel elements to be released for the higher priority application or call, computing an efficiency factor for all channel elements currently occupied by a single application or call and for all groups of channel elements having a total number of channel elements at least equal to the computed number of channel elements to be released for the higher priority application or call as a quotient of the data rate of the applications or calls currently using the channel elements or of the sum of the data rates of all applications and calls currently using the group of channel elements divided by the number of channel elements occupied by the application or call or by the group of channel elements, releasing the channel elements or group of channel elements with the lowest efficiency factor.

8. The process defined in claim 7, wherein a priority of the applications and calls currently using the channel elements or group of channel elements is considered.

9. The process defined in claim 8, wherein the efficiency factors of only those channel elements and groups of channel element are computed whose applications or calls in current use have the lowest priority.

10. The process defined in claim 9, wherein only those channel elements and groups of channel elements are released whose applications or calls in current use have the lowest priority.

11. The process defined in claim 8, wherein the channel elements are grouped according to their priority.

12. The process defined in claim 11, wherein if the grouped channel elements of the lowest priority are not sufficient to deliver the number of currently required channel elements, channel elements of the next higher priority are additionally selected as the target of release and added to the group.

* * * * *